Patented June 22, 1948

2,443,918

UNITED STATES PATENT OFFICE 2,443,918

LIGHT-DIFFUSING CELLULOSE ACETATE COMPOSITIONS

Joseph Edouard Gustave Lahousse, Lyon, and Albert Renouprez, Le Peage-de-Roussillon, France, assignors to Societe Des Usines Chimiques Rhone-Poulenc, Paris, France, a French company No Drawing. Application June 25, 1945, Serial No. 601,553. In France June 19, 1944

Section 1, Public Law 690, August 8, 1946
Patent expires June 19, 1964

6 Claims. (Cl. 106—196)

Plastic sheet material based on cellulose derivatives, which diffuse light, are already well known: in general they are obtained by incorporating in the mass finely divided, white or coloured opaque pigments. These materials only allow part of the incident light to pass, a more or less considerable proportion of the luminous flux being stopped by the pigment. Another known method of obtaining sheets which diffuse light consists in matting their surface by roughening with a metallic plate itself matted by sand blast: sheets thus treated exhibit a pleasant whitish velvety appearance due to the matted surface and are generally employed for making lamp shades.

The present invention has for its object to provide novel plastics based on cellulose derivatives, which diffuse light and are obtained by a process quite different from previously known materials and, in comparison with which, give a quite different visual impression. Essentially, these new plastics are characterized by containing, distributed throughout the plastic mass, granules of another (secondary) cellulosic material having a different refractive index from that of the base material. These granules have an average diameter of between $5/100$ and $10/100$ of a millimetre. When a ray of light falls onto a sheet of plastic thus constituted, it strikes, in passing through the sheet, the small grains of secondary cellulosic material, and is refracted. In effect, therefore, the light follows a sinuous course in the interior of the mass. An intense diffusive effect is thereby obtained: when a source of light is observed through the sheet, it cannot be distinguished clearly, but the body of the sheet appears luminous. This particular property can be utilised in many different fields, for instance in that of illumination, in that of the imitation of natural materials or in the creation of fancy articles.

The plastic materials of the invention may be prepared by incorporating in the basic cellulosic material, during the course of its manufacture and at any stage therein, grains of another cellulosic material having a different refractive index and one which is not dispersed by the solvents employed in the operation. If the basic material is, for example, a plastic based on cellulose acetate soluble in acetone, it is possible to employ as secondary cellulosic material other cellulose esters having different solubilities, such for instance as cellulose triacetate, or cellulose ethers, such for instance as certain qualities of methyl cellulose. These products can be incorporated, for example, during the mastication or working (rolling) of the plastic mass, but it is also possible to introduce them at other stages of manufacture: the criterion is that during the course of the subsequent operations the grains shall not be dispersed in a state of extreme fineness, for then the diffusion effect would no longer be obtained.

It is also possible to employ the secondary cellulosic material not only in the form of fine granules but also in a coarser form, such as pulp or flakes. By the swelling and softening action of the solvents utilised in the mechanical working of the plastic material, these flakes are broken up and distribute themselves throughout the mass in the form of particles, which are more or less tenuous according to the degree of thoroughness of mechanical working of the material; this work must, in accordance with the invention, be stopped at the stage at which the material has acquired the desired degree of optical heterogeneity. If the base of the plastic is not cellulose acetate but some other cellulose product, the secondary material will be selected from those other cellulose derivatives which best satisfy the requirements hereinbefore mentioned and which therefore give the best results.

It will be understood that the effect obtained varies according to the proportion of secondary cellulosic material incorporated, as also to its greater or less condition of subdivision. Nevertheless, other things being equal, a thick sheet will have a greater diffusing power than a thin one. It is easy for one versed in the art to choose in each particular case the proportions and the fineness of subdivision as also the thickness of sheet suitable for the intended purpose.

The basic cellulose material may be dyed or coloured by means of the usual dyes or pigments; the diffusion effect peculiar to the invention is superimposed on the basic coloration thus achieved. The diffusive materials obtained in accordance with the invention can be utilised alone or be combined according to the usual practice of the plastics industry with material having other basic colorations to obtain composite marbled sheets or to obtain colour contrasts.

The present invention is illustrated by the following non-limitative examples:

*Example I*

Cellulose acetate titrating 52% of acetic acid is masticated in the presence of a solvent (made up of acetone, ethyl alcohol and benzene) with ⅓ of its weight of a plasticiser composed of equal parts of triphenyl phosphate and methyl phthalate. When the mass is homogeneous, it is withdrawn from the masticator and is worked between rolls. On the rolls, there are incorporated in the plastic mass, for every 100 parts of dry material, 5 parts of a cellulose triacetate titrating 62% of acetic acid and having the form of a fine powder passing a sieve of 150 mesh. When the mixture is homogeneous, it is drawn into thin sheets, and a block is prepared by putting these sheets into a press in accordance with the usual procedure of the Celluloid industry. This block is cut into sheets 4 mm. thick.

When an electric light bulb with clear glass is examined through these sheets, the surface of the sheets appears fully illuminated, while the filament of the bulb cannot be distinguished clearly; the light from the bulb is strongly diffused, and moreover the sheets exhibit a unique granular appearance. If the electric bulb is examined in the same manner through a sheet of plastic containing a pigment, such as titanium oxide, the effect obtained is quite different; with a small proportion of titanium oxide the sheet appears shady, but the bright filament can be very clearly distinguished. As the proportion of titanium oxide increases, so the opacity of the sheet becomes progressively greater, but the filament always appears bright and un-deformed; in other words, the effect of light diffusion is never obtained in a definite manner.

*Example II*

A plastic mass identical with that of Example I is prepared. After mastication, rolling and pressing a block is obtained, which is cut into sheets 1 mm. thick. These sheets, which are completely transparent, are sprinkled with grains of cellulose triacetate titrating 62% of acetic acid; these grains are such as pass a 150 mesh sieve but are retained by a 200 mesh sieve and have a refractive index of about 1.46, while that of the plastic mass is 1.49. This triacetate is not soluble in the solvent based on acetone which is employed for masticating the initial plastic mass. The sheets dusted with triacetate are piled up and returned to the press. A new block is obtained which when cut up gives sheets exhibiting a diffusion effect similar to that of the sheets in Example I.

*Example III*

Methyl cellulose obtained in accordance with the method of French Patent 813,988 and titrating 28% of $OCH_3$ is ground to a powder passing a 100 mesh screen. This powder is incorporated on the rolls to the amount of 2% of the principal mass of cellulose acetate described in Example I. A further addition is made of 0.1 g. of titanium oxide per kg. to give a slight general cloudiness, and the mass is tinted with 0.05 g. of Japan Orange 2R per kg. After pressing and cutting, sheets are obtained which are a remarkably good imitation of natural tortoise shell.

*Example IV*

Cellulose acetate titrating 52% of acetic acid is masticated in a solvent made up of equal aparts of acetone and ethyl alcohol with ⅓ of its weight of a plasticiser which is a mixture of triphenyl phosphate and methyl phthalate. To the paste obtained is added 10% of its weight in dry matter of a methyl cellulose identical with that used in Example III, but which has been swelled in a small quantity of the same solvent. The whole is tinted by the addition of 0.250 g. of Japan Brown per kg. of dry material. After rolling and pressing, the block obtained is cut into sheets 2 mm. thick. These sheets, which exhibit a high diffusion effect, can be utilised for making articles intended as luminaires.

*Example V*

The pale sheets obtained by the process of Example III are mixed with brown sheets by the processes currently used in the Celluloid industry. Imitations are thus obtained of tortoise shell having brown veins and exhibiting a very characteristic effect of light diffusion.

*Example VI*

In a mixer of usual type, a plastic mass is prepared comprising 80% of cellulose acetate and 20% of methyl phthalate. The solvent utilised is a mixture of acetone, ethyl alcohol and benzene. 3% of the methyl cellulose utilised in Example III is added in the form of fine flakes. By the mechanical work of mastication and under the swelling action of the solvents, the methyl cellulose distributes itself throughout the mass without true solution. After rolling, pressing and cutting, sheets are obtained by means of which novel effects useful in the fancy goods trade can be provided. Moreover, during the course of the mastication, the mass can be coloured in different ways, either with dyes or with pigments.

We claim:

1. Novel plastic compositions which diffuse light and which comprise a main body of cellulose acetate composition soluble in acetone and a secondary cellulosic material selected from the group consisting of cellulose esters and cellulose ethers insoluble in acetone, such secondary cellulosic material having a refractive index different from that of the basic cellulosic material and being distributed throughout the mass of the basic cellulosic material in the form of granules having an average particle size between $5/100$ and $10/100$ of a millimeter.

2. A plastic composition as claimed in claim 1 wherein the secondary cellulosic material is cellulose triacetate.

3. A plastic composition as claimed in claim 1 wherein the secondary cellulosic material is methylcellulose.

4. Novel plastic compositions which comprise a main body of cellulose acetate composition soluble in acetone and a secondary cellulosic material selected from the group consisting of cellulose esters and cellulose ethers insoluble in acetone, such secondary cellulosic material having a refractive index different from that of the basic cellulosic material and being distributed throughout the mass of the basic cellulosic material in the form of granules having an average particle size between $5/100$ and $10/100$ of a millimeter, which particles have the effect of scattering incident light and render the composition translucent but non-transparent.

5. A plastic composition which is not less light-diffusive than natural tortoise shell which comprises an acetone-soluble cellulose acetate composition containing throughout the mass discrete granules of cellulose triacetate, said granules having a particle size not less than 5/100 of a millimeter and not greater than 10/100 of a millimeter.

6. A plastic composition which comprises a main body of acetone-soluble plasticized cellulose acetate which contains distributed throughout the mass discrete particles of methyl cellulose having a particle size not smaller than 5/100 of a millimeter and not greater than 10/100 of a millimeter, which composition is pigmented to resemble natural tortoise shell and which composition, by virtue of said discrete particles, has a light diffusion effect not less than that of natural tortoise shell.

JOSEPH EDOUARD GUSTAVE LAHOUSSE.
ALBERT RENOUPREZ.

REFERENCES CITED

The following references are of record in the file of this patent:

UNITED STATES PATENTS

| Number | Name | Date |
| --- | --- | --- |
| 1,822,416 | Nonamaker | Sept. 8, 1931 |
| 1,966,578 | Bohnson et al. | July 17, 1934 |
| 1,984,477 | Hagedorn et al. | Dec. 18, 1934 |
| 2,039,307 | Dreyfus | May 5, 1936 |
| 2,073,637 | Dreyfus | Mar. 16, 1937 |
| 2,101,885 | Whitehead | Dec. 14, 1937 |
| 2,234,307 | Kantorowicz | Mar. 11, 1941 |
| 2,287,556 | Land | June 23, 1942 |